US008669741B2

(12) United States Patent
Seo et al.

(10) Patent No.: US 8,669,741 B2
(45) Date of Patent: Mar. 11, 2014

(54) BATTERY MANAGEMENT SYSTEM AND DRIVING METHOD THEREOF

(75) Inventors: Se-Wook Seo, Yongin-si (KR); Soo-Seok Choi, Yongin-si (KP); Young-Jo Lee, Yongin-si (KR); Yong-Jun Tae, Yongin-si (KR); Han-Seok Yun, Yongin-si (KR); Gye-Jong Lim, Yongin-si (KR); Beom-Gyu Kim, Yongin-si (KR); Ho-Young Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1710 days.

(21) Appl. No.: 11/767,094

(22) Filed: Jun. 22, 2007

(65) Prior Publication Data

US 2008/0036421 A1 Feb. 14, 2008

(30) Foreign Application Priority Data

Aug. 11, 2006 (KR) .................. 10-2006-0076148

(51) Int. Cl.
*H02J 7/00* (2006.01)
*H02J 7/16* (2006.01)

(52) U.S. Cl.
USPC ........... 320/132; 320/104; 320/134; 320/136; 320/133

(58) Field of Classification Search
USPC .......... 320/132, 104, 134, 135, 136, 133, 137
See application file for complete search history.

(56) References Cited

U.S. PATENT DOCUMENTS

| 6,441,619 | B1 * | 8/2002 | Araki et al. ................... 324/427 |
| 6,608,482 | B2 * | 8/2003 | Sakai et al. ................... 324/426 |
| 7,136,762 | B2 * | 11/2006 | Ono ............................... 702/63 |
| 7,154,247 | B2 * | 12/2006 | Kikuchi et al. ............... 320/132 |
| 7,477,038 | B2 * | 1/2009 | Taniguchi ..................... 320/104 |
| 7,622,894 | B2 * | 11/2009 | Kawahara et al. ............ 320/127 |
| 2003/0052646 | A1 * | 3/2003 | Minamiura et al. .......... 320/122 |
| 2005/0017684 | A1 * | 1/2005 | Brecht ......................... 320/131 |
| 2005/0035743 | A1 * | 2/2005 | Kawakami et al. ........... 320/162 |
| 2005/0269991 | A1 * | 12/2005 | Mitsui et al. ................. 320/132 |
| 2006/0220619 | A1 * | 10/2006 | Namba et al. ................. 320/149 |
| 2006/0261782 | A1 * | 11/2006 | Kim et al. ..................... 320/132 |

FOREIGN PATENT DOCUMENTS

| JP | 2000-137062 | 5/2000 |
| KR | 1997-2338 | 1/1997 |
| KR | 2001-59081 | 7/2001 |

* cited by examiner

*Primary Examiner* — Edward Tso
*Assistant Examiner* — Alexis Boateng
(74) *Attorney, Agent, or Firm* — Christie, Parker & Hale, LLP

(57) ABSTRACT

A battery management system (BMS) manages a battery for a hybrid vehicle including an engine control unit and a motor generator controlled by the engine control unit and connected to a battery including at least one battery pack, each pack including a plurality of battery cells. The BMS includes a sensor and an MCU unit. The sensor detects temperature, current, and open circuit voltage (OCV) of the battery. The MCU receives the detected temperature, current, and OCV, calculates a key-off time period which is a period between a time point when a battery key-on state ends and a time point when a subsequent battery key-on state begins, calculates an OCV error range corresponding to an SOC error range detected at the key-off time point, and infers an initial SOC of the battery.

7 Claims, 3 Drawing Sheets

BATTERY MANAGEMENT SYSTEM AND DRIVING METHOD THEREOF

CROSS-REFERENCE TO RELATED APPLICATIONS

This application claims the benefit of Korean Application No. 2006-76148, filed Aug. 11, 2006, in the Korean Intellectual Property Office, the disclosure of which is incorporated herein by reference.

BACKGROUND OF THE INVENTION

1. Field of the Invention

Aspects of the present invention relate to a battery management system. More particularly, aspects of the present invention relates to a battery management system ("BMS") that can be used in an electric vehicle using electrical energy, and a driving method thereof.

2. Description of the Related Art

A vehicle using an internal combustion engine using gasoline or diesel as a main fuel tends to create environmental pollution such as air pollution. Accordingly, in order to reduce pollution, great efforts have recently been made to develop electric vehicles and hybrid vehicles.

An electric vehicle is a vehicle that uses electrical energy from a battery pack, typically including a plurality of rechargeable battery cells that can be charged and discharged many times. Electric vehicles do not emit noxious exhaust gas and are almost noiseless since they are mainly powered by the battery pack.

A hybrid vehicle is a vehicle that is configured to operate with two or more kinds of power sources such as an internal combustion engine and a battery powered engine. Currently, hybrid vehicles are being developed that use an internal combustion engine and a fuel cell that directly obtains electrical energy by a chemical reaction between hydrogen and oxygen and that stores the electrical energy in a battery pack.

The number of rechargeable battery cells in an electric vehicle using a battery powered engine is currently increasing, and therefore, vehicles need a battery management system (BMS) to provide a cell balancing control method in order to effectively manage a plurality of battery cells connected to each other.

In particular, the state of charge ("SOC") of a battery is determined by detecting an open circuit voltage ("OCV") in a key-on state and an initial SOC is inferred using a table relating SOCs to OCVs based on temperature. However, since the conventional initial SOC inferring method is carried out without considering factors such as the amount of time that a battery was in a key-off state before the subsequent key-on time point, an OCV error range caused by temperature, and an OCV detected in the key-on state as well as a temperature and an OVC detected in the key-off state, but simply uses an OCV table relating SOCs and OVCs based on temperature, the conventional method may be inaccurate in inferring the precise initial SOC upon the start of the key-on state.

The above information disclosed in this Background section is provided for enhancement of understanding of the background of various aspects of the invention. The discussion of such information is not intended to represent or suggest that such information constitutes prior art that is already known in this country to a person of ordinary skill in the art.

SUMMARY OF THE INVENTION

Aspects of the present invention have been made to provide a battery management system and a driving method thereof.

According to an embodiment of the present invention, there is provided a BMS for a hybrid vehicle including an engine control unit and a motor generator controlled by the engine control unit and a battery in which a plurality of battery cells are grouped into at least one battery pack, including a sensor that senses temperature, current, and open circuit voltage (OCV) of the battery in a key-on state, and an MCU that receives the temperature, current, and OCV data from the sensor, calculates a key-off time period which is a time period that a battery has been in a key-off state from a key-off time point and a difference between temperatures of the battery detected at the start of respective key-off states and key-on states, calculates an OCV error range corresponding to an SOC error range of the key-off time period, and infers an initial SOC of the battery at the key-on time point.

The MCU may take the SOC at the key-off time point to be the initial SOC such as when the key-off time period is shorter than a reference time period. The MCU may receive data on temperatures of the battery detected at respective key-off and key-on time points and an OCV at the key-on time point, calculate an OCV error range corresponding to the SOC error range at the key-off time point in the case that the key-off time period is longer than the reference time period, and then infer the initial SOC using an OCV table that relates SOCs and OCVs based on temperature when the OCV at the key-on time point is a voltage that is not within the OCV error range corresponding to the SOC error range of the key-off time point. The MCU may determine the initial SOC to be the SOC at the key-off time point when OCV at the key-on time point is a voltage in the OCV error range corresponding to the SOC error range of the key-off time point and when a difference between temperatures of the battery detected at the respective key-on time point and key-off time point is smaller than the reference temperature value. However, the MCU may infer the initial SOC using an OCV table that relates SOCs and OVCs based on temperature when an OCV at the key-on time point is a voltage in the OCV error range corresponding to the SOC error range at the key-off time point, and a difference between temperatures of the battery detected at respective key-on time point and key-off time point is greater than the reference temperature. The reference time period is a predetermined time period representing an amount of time that elapses from a key-on point until the OCV of the key-on state is stabilized. The reference temperature value is a predetermined temperature value that is determined based on a temperature history of temperature differences of the battery detected at a key-on time point and a key-off time point.

According to a further aspect of the present invention, there is provided a hybrid vehicle comprising an engine control unit; a motor generator controlled by the engine control unit, and a battery connected to the motor generator and comprising a plurality of battery cells grouped into a plurality of battery packs; and the battery management system.

According to a further aspect of the present invention, there is provided a method of determining an initial state of charge (SOC) of a battery of a hybrid vehicle at a key-on time point following a key-off time period, the key-off time period beginning with a key-off time point and ending with the key-on time point, the method comprising: comparing the key-off time period with a reference time period, wherein if the key-off time period is less than the reference time period, the initial SOC is determined to be the SOC at the key-off time point, and if the key-off time period is not less than the reference time period, determining whether an open circuit voltage (OCV) detected at the key-on time point is a voltage within the OCV error range corresponding to the SOC error range detected at the key-off time point, wherein, if the OCV detected at the key-on time point is not a voltage within an OCV error range corresponding to an SOC error range detected at the key-off time point, the initial SOC is determined according to an OCV and temperature of the battery at the key-on time point from a table that relates SOCs to OCVs based on temperature, and if OCV detected at the key-on time point is a voltage within an OCV error range corresponding to an SOC error range detected at the key-off time point, determining whether an absolute value of a difference between temperatures of the battery detected at the key-on time point and the key-off time point is greater than a reference temperature value, wherein if the difference between temperatures detected at the key-on time point and the key-off time point is greater than the reference temperature, the initial SOC is determined according to an OCV and temperature at the key-on time point from a table that relates SOCs to OCVs based on temperature and wherein, if the difference between temperatures detected at the key-on time point and the key-off time point is not greater than the reference temperature, the initial SOC is determined to be the SOC at the key-off time point.

According to a further aspect of the present invention, there is provided a driving method of a BMS for a hybrid vehicle including an engine control unit and a motor generator controlled by the engine control unit and connected to a battery in which a plurality of battery cells are grouped into at least one battery pack, including comparing a key-off time period of the battery with a reference time period, determining whether an OCV of the key-on time point is a voltage within an OCV error range corresponding to an SOC error range of the key-off time point, comparing a difference between temperatures of the battery detected respectively at the key-on and key-off time points with a reference temperature value, and determining an initial state of charge (SOC) as the result of the comparing of the key-off time period with the reference time period, determining whether the OCV detected at the key-on time point is a voltage within the OCV error range corresponding to an SOC error range detected at the key-off time point and comparing a difference between temperatures detected at the key-on time point and the key-off time point with the reference temperature value. The SOC detected at the key-off time point is assumed to be the initial SOC when the key-off time period is shorter than the reference time period. A main control unit of the BMS receives temperatures detected at the key-on time point and the key-off time point, respectively, and an OCV error range at the key-on time point, and detects the OCV error range corresponding to an SOC error range at a key-off time point if the key-off time period is longer than the reference time period. Determining an initial state of charge (SOC) includes inferring the initial SOC using the OCV table that relates SOCs and OCVs based on temperature if the OCV at the key-on time point is a voltage that is not within the OCV error range corresponding to the SOC error range at the key-off time point. The SOC of the key-off status is assumed to be the initial SOC of the battery when the OCV at the key-on time point is a voltage within the OCV error range corresponding to the SOC error range detected at the key-off time point, and when a difference between temperatures of the battery detected at the key-on time point and the key-off time point is less than a reference temperature value. The initial SOC is inferred using an OCV table that relates SOCs and OCVs based on temperature when an OCV at the key-on time point is a voltage within the OCV error range corresponding to the SOC error range detected at the key-off time point and when a difference between temperatures detected at the key-on time point and the key-off time point is greater than the reference temperature value. The reference time period is a time period that elapses while the OCV at a key-on time point is stabilized. The reference temperature is a predetermined temperature value that is determined based on a temperature history of temperature differences of the battery detected at a key-on time point and a key-off time point.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
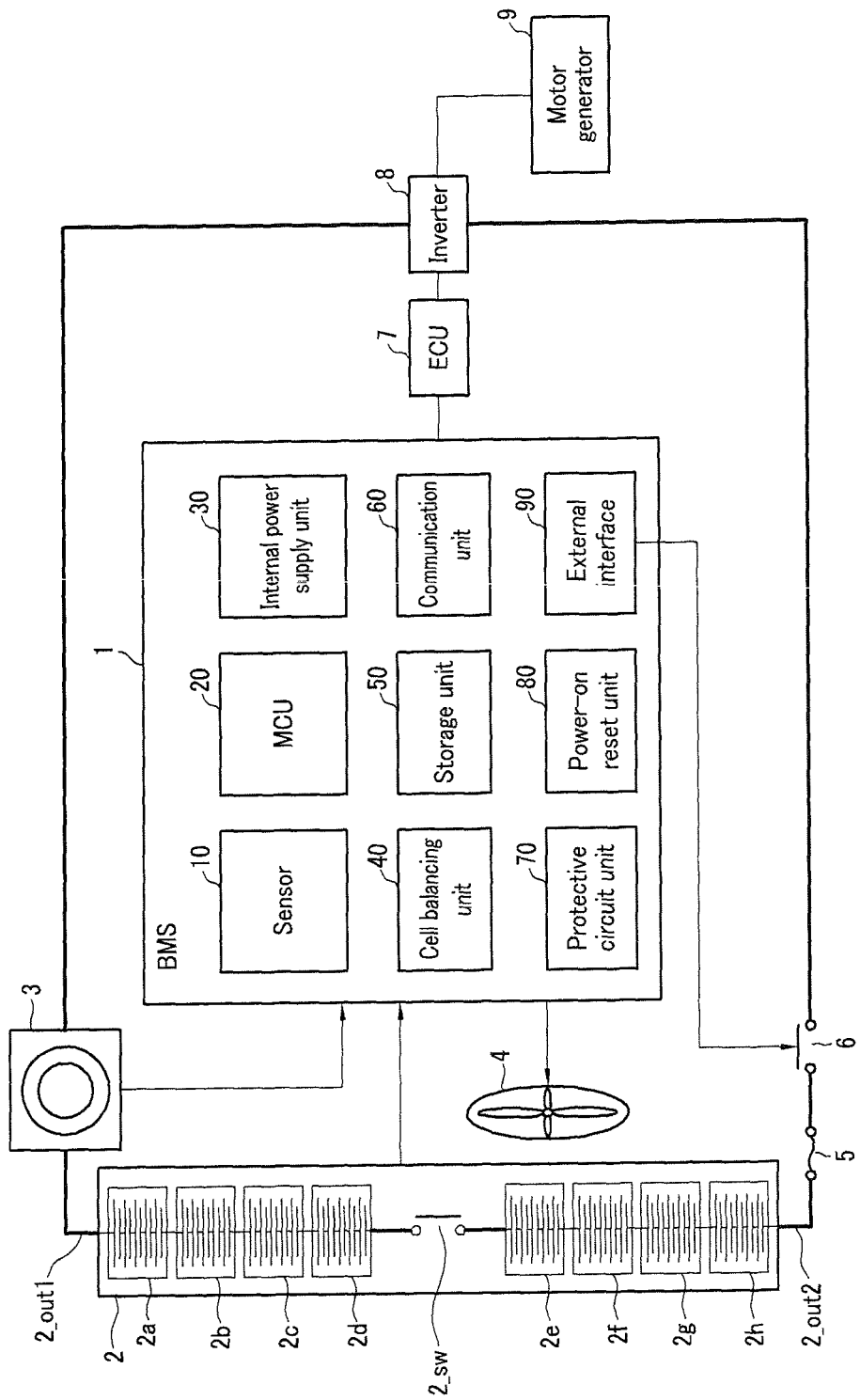
FIG. 1 is a schematic diagram illustrating a battery, a BMS, and peripheral devices of the BMS according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of the present invention provide a battery management system (BMS) and a driving method thereof. The BMS is capable of precisely assuming an initial SOC by considering a key-off time period between a time point that a key-on state ends and a time point that a next key-on state begins, and battery states at respective key-off and key-on time points.

In the following detailed description, only certain embodiments of the present invention have been shown and described, simply by way of illustration. As would be realized by persons skilled in the art, the described embodiments may be modified in various different ways, all without departing from the spirit or scope of the present invention. Accordingly, the drawings and description are to be regarded as illustrative in nature and not restrictive.

Throughout the specification, the term "connected" refers not only to devices that are directly connected but also refers to devices that are electrically connected via a third device or object. Further, when it is stated that a certain part includes a certain constituent element, it must not be construed in a manner such that the certain part excludes other constituent elements other than the certain constituent element, but it is to be construed in a manner such that the certain part may further include constituent elements other than the certain constituent element, insofar as there is no particular statement to the contrary.

FIG. 1 schematically illustrates a battery, a BMS, and peripheral devices of the BMS according to an embodiment of the present invention.

As shown in FIG. 1, a vehicle includes a BMS 1, a battery 2, a current sensor 3, a cooling fan 4, a fuse 5, a main switch 6, an engine control unit (ECU) 7, an inverter 8, and a motor generator 9.

The battery 2 includes a plurality of sub-packs 2a through 2h, each containing a plurality of battery cells coupled in series, an output terminal 2_OUT1, and a safety switch installed between the sub-pack 2d and the sub-pack 2e. Eight sub-packs, 2a through 2h, are shown in FIG. 1, but the number of sub-packs is not limited to eight and can be greater or less than that number. The safety switch 2_SW installed between the sub-packs 2d and 2e can be replaced with a battery, or may be a switch that can be manually turned on and off for the safety of an operator working on the battery cells. Further, even though the BMS according to FIG. 1 includes the safety switch 2_SW installed between the sub-packs 2d and 2e, the location of the safety switch 2_SW is not limited thereto. The output terminal 2_OUT1 and the output terminal 2_OUT2 are connected to an inverter 8.

The current sensor 3 detects output current from the battery 2 and transmits the detected data to a sensor 10 of the BMS 1. In more detail, the current sensor 3 may be a hall current transformer that detects current using a hall device and outputs an analog current signal corresponding to the detected current.

The cooling fan 4 reduces heat that can be generated during the charge and discharge operations of the battery 2, which are carried out in response to the control signal. The cooling fan keeps the battery 2 from deteriorating in terms of charge and discharge efficiency due to an increase in temperature.

The fuse 5 prevents an overcurrent, which can be caused due to breaking of a wire or a short-circuit, from flowing to the battery 2. That is, if an overcurrent occurs, the fuses is blown to intercept the overcurrent so that it cannot flow to the battery 2.

The main switch 6 turns the battery 2 on and off in response to a control signal from the BMS 1 or the ECU 7 of the vehicle upon occurrence of an abnormal status such as, for example, an over-voltage, an over-current, or an abnormally high temperature.

The BMS 1 includes the sensor 10, a main control unit (MCU) 20, an internal power supply unit 30, a cell balancing unit 40, a communication unit 60, a protective circuit unit 70, a power-on reset unit 80, and an external interface unit 90.

The sensor 10 detects the overall current of the battery pack (hereinafter referred to as the "pack current"), the overall voltage of the battery pack (hereinafter referred to as the "pack voltage"), the pack temperature, and the cell peripheral temperature, and then transmits the detected data to the MCU 20.

The MCU 20 infers the state of charge (SOC) of the battery 2 based on the battery pack current, the battery pack voltage, the cell voltage of each battery cell, the cell temperature of each battery cell, and the cell peripheral temperature, and generates a signal that shows the state of the battery 2. The MCU 20 accesses a key-off time point and a key-on time point if a key-on status in which a starting signal is given is detected, and calculates a key-off time period, which is referred to as the time period from when a key-on state ends to when a next key-on state begins. In other words, the MCU 20 determines how long a key-off period has lasted. The MCU 20 then compares the calculated key-off time period and the reference time period, and infers an initial SOC in response to the comparison result. For example, the SOC inference method may use a first method in which the SOC at the key-off time point is assumed to be the initial SOC, and a second method in which the initial SOC is assumed using an OCV-to-SOC table that relates SOCs and OCVs based on temperature. Further, the MCU 20 receives the temperature of the battery pack, the current, and the OCV detected at the key-on time point and the temperature and the SOC detected at the key-off time point. Next, the MCU 20 calculates an OCV error range, which corresponds to an SOC error range at the key-off time point. Next, the MCU 20 compares the OCV of the key-on time point and the OCV error range corresponding to the SOC error range of the key-off time point. If the comparison result shows that the OCV of the key-on time point is not a voltage within the OCV error range corresponding to the SOC error range of the key-off time point, the MCU 20 takes the initial SOC using the OCV table that relates SOCs and OCVs based on temperature. If the comparison result shows that the OCV of the key-on time point is a voltage within the OCV error range corresponding to the SOC error range of the key-off time point, the MCU 20 calculates a difference between temperatures at respective key-on and key-off time points, and then further compares the absolute value of the difference of the temperatures and a reference temperature value. Then, the MCU 20 determines the initial SOC based on the comparison result. Accordingly, the MCU 20 takes the SOC of the key-off time point as the initial SOC when the key-off time period is short, or if the OCV of the key-on time point is a voltage within the OCV error range corresponding to the SOC error range of the key-off time point and the difference between temperatures of the key-off time point and the key-on time point is less than the reference temperature value.

The internal power supply unit 30 is a device that supplies power to the BMS 1 using an auxiliary battery. The cell balancing unit 40 balances the charging state of each battery cell. That is, the call balancing unit 40 can discharge battery cells that are in a relatively high charge state, and can charge battery cells that are in the relatively low charge state. A storage unit 50 stores current data relating to the battery such as the SOC and state of health ("SOH") detected when the BMS 1 is powered off. The storage unit 50 may include a non-volatile storage device such as an EEPROM in which data can be electrically erased and recorded. The communication unit 60 communicates with the ECU 7 of the vehicle. That is, the communication unit 60 transmits the data containing the SOC and SOH from the BMS 1 to the ECU 7, receives information about the status of the vehicle from the ECU 7, and transmits the information to the MCU 20. The protective circuit unit 70 protects the battery 2 from external impact, over-current, and low voltage using firmware. The power-on reset unit 80 resets the entire system when the BMS 1 is powered on. The external interface unit 90 serves to connect auxiliary devices such as the cooling fan 4 and the main switch 6 to the MCU 20. While only the cooling fan 4 and the main switch 6 are shown as auxiliary devices connected to the MCU 20 by the internal interface unit 90, it is to be understood that other auxiliary devices may be connected to the MCU 20 by the internal interface unit 90.

The ECU 7 determines the present driving status of the vehicle based on information such as accelerator, brake, and current driving speed, and determines necessary information such as torque. In more detail, examples of the present driving status information of a vehicle include the key-on state for starting of the vehicle, the key-off state for turning off the vehicle, controlled driving, and acceleration driving. The ECU 7 transmits the current vehicle driving status information to the communication unit 60 of the BMS 1. The ECU 7 controls the vehicle in a manner such that the output of the motor generator 9 matches the torque information. In more detail, the ECU 7 controls the switching of the inverter 8 so that the output of the motor generator 9 matches the torque information. Further, the ECU 7 receives the SOC of the battery 2 from the MCU 20 via the communication unit 60 of the BMS 1, and controls the SOC of the battery 2 so that the SOC is a predetermined percentage, such as 55%, for example, of a target value. For example, if the SOC transmitted from the MCU 20 is not greater than the predetermined percentage of the target value, the MCU 7 controls the switching of the inverter 8 in a manner such that power is outputted toward the battery 2 so that the battery 2 is charged. At this time, the pack voltage Ip becomes a negative value. On the other hand, if the SOC is greater than the predetermined percentage of the target value, the inverter 8 is switched in a manner such that power is outputted toward the motor generator 9 so that the battery 2 is discharged. At this time, the pack current Ip becomes a positive value.

In this way, the inverter 8 is switched in response to a control signal from the ECU 7 so as to charge or discharge the battery 2.

The motor generator 9 drives the vehicle based on the torque information from the ECU 7 using electrical energy of the battery 2.

In summary, the ECU 7 charges or discharges the battery 2 based on the SOC by the amount of power that can be charged and discharged, thereby preventing the battery 2 from being over-charged or over-discharged. Accordingly, the battery 2 can be used effectively over a long lifespan. However, since it is difficult to detect actual SOC after the battery 2 is mounted in a vehicle, the BMS 1 must accurately infer the SOC using the pack voltage, the pack temperature, and the cell temperature as detected by the sensor 10, and transmit the inferred SOC to the ECU 7.

Hereinafter, a method of assuming an initial SOC will be described with reference to FIG. 2 and FIG. 3. Herein, the term "key-off time period" refers to an elapsed time until a subsequent key-on state begins after a previous key-on state ends, and the term "reference time period" refers to an amount of time that elapses until the OCV is stabilized from the beginning of a key-on state.

Further, the term "reference temperature value" refers to a predetermined temperature difference that is compared with the difference between temperatures detected at key-on and key-off time points in determining an initial SOC. The reference temperature value may be determined based on a temperature history of temperatures at previous key-on and key-off points of the battery. As discussed more fully below, the SOC of the key-off time point is taken as the initial SOC if the difference between temperatures detected at key-on and key-off time points; otherwise, more calculations are performed.

The term "OCV table that relates SOCs and OCVs based on temperature" refers to stored data in which SOC values are related to OCV values. The stored data accounts for changes in the relationship between SOC values and OCV values at different temperatures.

The maximum value Vmax and the minimum value Vmin of the OCV error range corresponding to the SOC error range on the key-off time period is determined based on the sensing output of the voltage detector of the BMS 1. The MCU 20 does not assume a new initial SOC when the detected OCV voltage is within the OCV error range, but rather the MOC 20 relies on the SOC of the key-off time point and takes the SOC of the key-off time point as the initial SOC.

Figure 2:
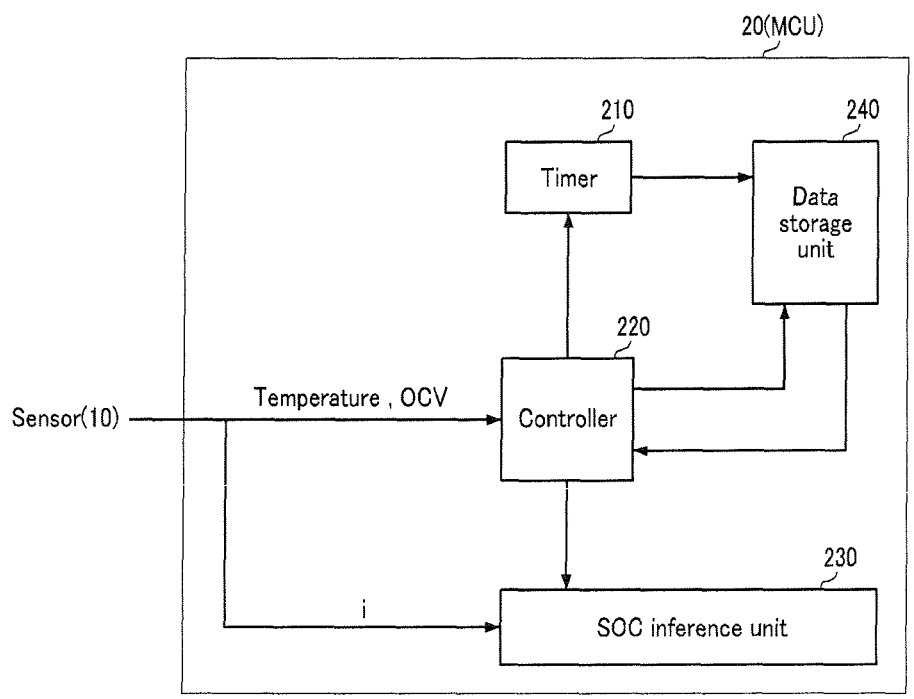
FIG. 2 is a schematic view illustrating an MCU of the BMS of FIG. 1.

FIG. 2 is a schematic diagram illustrating the MCU 20 of the BMS 1 of FIG. 1.

As shown in FIG. 2, the MCU 20 includes a timer 210, a controller 220, an SOC inference unit 230, and a data storage unit 240.

The timer 210 is controlled by the controller 220. The timer 210 detects key-on and key-off time points and transmits the detected data to the data storage unit 240.

The controller 220 controls the timer 210, the SOC inference unit 230, and the data storage unit 240 when the key-on state in which starting is initiated is detected. At this time, the controller 220 receives data of the key-on time point and the key-off time point from the data storage unit 240. Then, the controller calculates the key-off time period, which is the time period from a previous key-off time point to the subsequent key-on time point. In other words, the key-off time period refers to the amount of time that the battery had been in a key-off state before it is turned on to be in a key-on state. The controller 220 compares the calculated key-off time period with the reference time period. If the key-off time period is shorter than the reference time period, the controller 220 assumes the SOC at the key-off time point to be the initial SOC, and then transmits the key-off SOC to the SOC inference unit 230. However, if the key-off time period is longer than the reference time period, the controller 220 receives the temperature and OCV detected at the key-on time point. The controller 220 then receives a temperature and an SOC of the key-off time point from the data storage unit 240. Next, the controller 220 determines an error range of the OCV corresponding to an error range of the SOC at the key-off time point. Then, the controller 220 compares the OCV of the key-on time point and the OCV error range corresponding to the SOC error range of the key-off time point. If the OCV of the key-on time point is not a voltage within the OCV error range corresponding to the SOC error range of the key-off time point, the controller 220 infers the initial SOC using an OCV table that relates SOCs and OCVs based on temperature and transmits the inferred initial SOC to the SOC inference unit 230. However, if the OCV of the key-on time point is within the OCV error range corresponding to the SOC error range of the key-off time point, the controller 220 calculates a difference between temperatures detected at the key-on time point and the key-off time point, and then compares the absolute value of the temperature difference with a reference temperature value. At this time, if the absolute value of the temperature difference is less than the reference temperature value, the controller 220 takes the SOC of the key-off time point as the initial SOC, and transmits it to the SOC inference unit 230. However, if the absolute value of the temperature difference of temperatures detected on the key-on time point and the key-off time point is greater than the reference temperature, the controller 220 infers the initial SOC using the OCV table that relates SOCs and OCVs based on each temperature, and then transmits the inferred initial SOC to the SOC inference unit 230.

The SOC inference unit 230 receives the initial SOC from the controller 220. The SOC inference unit 230 further receives current from a sensor 10. The SOC inference unit 230 infers the SOC through a current integration method in which an initial value is determined by the transmitted initial SOC and the transmitted current is accumulated to the initial value. However, the inferring of the SOC is not limited to the current integration method and the SOC inference unit 230 can infer an SOC through other methods.

The data storage unit 240 is controlled by the controller 220 and stores battery state information of the key-on and key-off states. That is, the data storage unit 240 stores the key-on and key-off time points, the temperatures detected at key-off time points, and the OCV error range corresponding to the SOC error range of the key-off time point.

Figure 3:
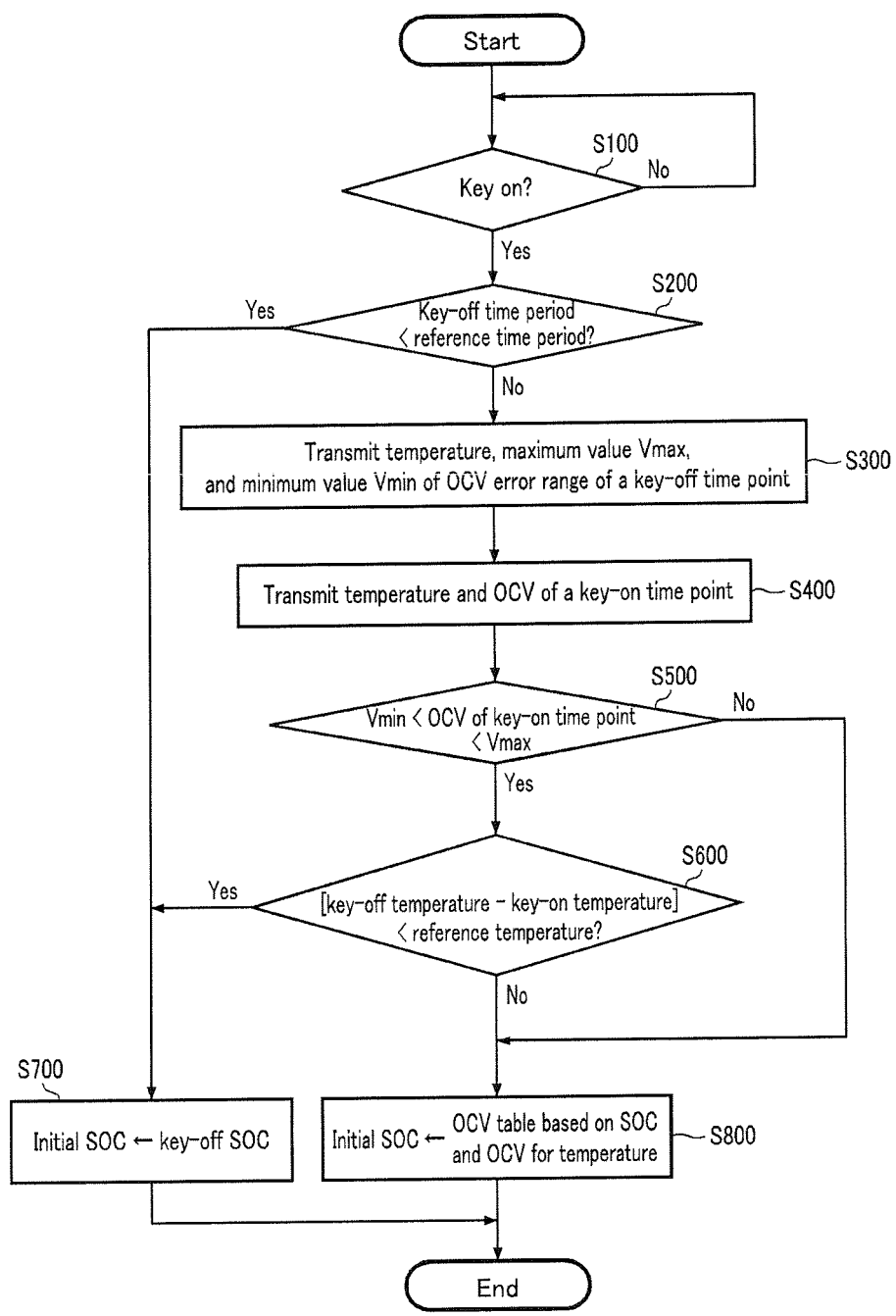
FIG. 3 is a flow chart showing a method of calculating an initial SOC carried out by the MCU according to an embodiment of the present invention.

FIG. 3 is a flow chart illustrating a method of inferring the initial SOC carried out by the MCU 20 according to an embodiment of the present invention.

First, the MCU 20 of the BMS 1 determines whether a key-on state is detected (S100). If a key-on state is not detected, S100 is repeated again. If the key-on state is detected, the controller 220 receives the key-on and key-off time points from the data storage unit 240, calculates the key-off time period, and then compares the calculated key-off time period with the reference time period (S200).

If the key-off time period is shorter than the reference time period, the controller 200 assumes the SOC detected at the key-off time point as an initial SOC, and than transmits it to the SOC inference unit 230 (S700). In S200, if the key-off time period is not shorter than the reference time period, the data storage unit 240 transmits the temperature and the SOC detected at the key-off time point to the controller 220 (S300). The sensor 10 transmits the temperature and the OCV detected at the key-on time point to the controller 220 (S400). Then, the controller 220 detects the OCV error range corresponding to the SOC error range of the key-off time point.

The controller 220 compares the OCV of the key-on time point and the OCV error range corresponding to the SOC error range of the key-off time point (S500). In S500, if the OCV of the key-on time point is not a voltage within the OCV error range corresponding to the SOC error range of the key-off time point, the controller 220 infers an initial SOC using an OCV table that relates SOCs and OCVs based on temperature, and then transmits the inferred initial SOC to the SOC inference unit 230 (S800). On the other hand, if the OCV of the key-on time point is a voltage within the OCV error range corresponding to the SOC error range of the key-off time point, the controller 220 calculates a difference between temperatures detected at a key-on time point and a key-off time point, and compares the absolute value of the difference of the temperatures and the reference temperature value (S600).

In S600, if the absolute value of the temperature difference is less than the reference temperature value, the controller 220 assumes the SOC of the key-off time point as the initial SOC, and then transmits the initial SOC to the SOC inference unit 230 (S700). On the other hand, if the absolute value of the temperature difference is not less than the reference temperature value, the controller 220 infers the initial SOC using the OCV table that relates SOCs and OCVs based on temperature, and transmits the initial SOC to the SOC inference unit 230 (S800).

As described above, in a BMS and a driving method thereof according to the embodiment of the present invention, if the key-off time period is shorter than the reference time period, the SOC detected at the key-off time point has relevance and is inferred as the initial SOC value. Further, if the OCV of the key-on time point is a voltage within the OCV error range corresponding to the SOC error range of the key-off time point, and the absolute value of the difference of temperatures detected respectively at a key-on time point and a key-off time point is less than the reference temperature value, the SOC of the battery at the key-off time point has relevance and is inferred as the initial SOC value. That is, the BMS according to aspects of the present invention can improve the accuracy of an inferred initial SOC in comparison with the conventional method using an OCV table that relates SOCs and OCVs based on temperature since the initial SOC is inferred based on the current state of the battery according to aspects of the present invention.

As described above, the BMS and the driving method thereof according to the embodiment of the present invention infers the initial SOC based on a result of comparison of the key-off time period with the reference time period when a key-on state starts, or based on a result of comparison of the temperature and OCV detected at the key-on time point with the temperature and the OCV error range corresponding to the SOC error range detected at the key-off time point. Accordingly, unlike the conventional method in which the initial SOC is inferred using the OCV table that relates the past SOC and OCV based on temperature, the method according to aspects of the present invention can precisely infer the initial SOC the initial SOC is inferred using the current status of the battery.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A battery management system (BMS) for a hybrid vehicle that includes an engine control unit, a motor generator controlled by the engine control unit, and a battery in which a plurality of battery cells are grouped into a plurality of battery packs, comprising:
   a sensor that senses temperature, current, and open circuit voltage (OCV) of the battery at a present key-on time point; and
   a main control unit (MCU) that calculates a key-off time period, the key-off time period being an amount of time that the battery has been in a key-off state from a key-off time point to a time point at which the present key-on state begins, that calculates a difference between temperatures of the battery respectively detected at the key-on time point and the key-off time point by receiving data of the temperature of the battery, that detects an OCV error range corresponding to an SOC error range at tile key-off time point, and that infers an initial SOC of the battery by using the OCV and the OCV error range;
   wherein the MCU takes the SOC detected at the key-off time point as the initial SOC when the key-off time period is shorter than a reference time period.

2. The BMS of claim 1, wherein, if the key-off time period is longer than the reference time period,
   the MCU receives the temperatures and the OCVs of the battery respectively detected at the key-on time point and the key-off time point, detects the OCV error range corresponding to the SOC error range at the key-off time point, and infers the initial SOC using a table that relates SOCs to OCVs based on temperature if the OCV detected at the key-on time point is a voltage that is not within the OCV error range corresponding to the SOC error range detected at the key-off time point.

3. The BMS of claim 2, wherein the MCU takes the SOC detected at the key-off time point as the initial SOC of the battery when the OCV detected at the key-on time point is a voltage within the OCV error range corresponding to the SOC error range detected at the key-off time point and when a difference between temperatures of the battery at the key-on time point and the key-off time point is less than a reference temperature value.

4. The BMS of claim 3, wherein the MCU assumes the initial SOC using a table that relates SOCs to OCVs based on temperature when the OCV at the key-on time point is a voltage within the OCV error range corresponding to the SOC error range detected at the key-off time point and when the difference between temperatures detected at the key-on time point and key-off time point is greater than the reference temperature value.

5. The BMS according to claim 1, wherein the reference time period is a predetermined time period representing an amount of time that elapses after the key-on time point while the OCV becomes stabilized.

6. The BMS of claim 3, wherein the reference temperature value is a predetermined temperature value that is determined based on a temperature history of temperature differences of the battery detected at the key-on time point and the key-off time point.

7. A hybrid vehicle comprising
an engine control unit;
a motor generator controlled by the engine control unit, and
a battery connected to the motor generator and comprising
   a plurality of battery cells grouped into a plurality of battery packs; and
the battery management system of claim 1.

* * * * *